(12) United States Patent
Farha et al.

(10) Patent No.: US 7,744,842 B2
(45) Date of Patent: Jun. 29, 2010

(54) GAS ADSORPTION AND GAS MIXTURE SEPARATIONS USING CARBORANE-BASED MOF MATERIAL

(75) Inventors: Omar K. Farha, Evanston, IL (US); Joseph T. Hupp, Northfield, IL (US); Youn-Sang Bae, Evanston, IL (US); Randall Q. Snurr, Evanston, IL (US); Alexander M. Spokoyny, Evanston, IL (US); Chad A. Mirkin, Wilmette, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 12/317,775

(22) Filed: Dec. 29, 2008

(65) Prior Publication Data
US 2009/0220400 A1    Sep. 3, 2009

Related U.S. Application Data

(60) Provisional application No. 61/010,014, filed on Jan. 4, 2008.

(51) Int. Cl.
*C01B 35/18* (2006.01)
*C01B 35/10* (2006.01)
*B01D 53/14* (2006.01)

(52) U.S. Cl. .................. 423/282; 423/283; 423/226; 423/220

(58) Field of Classification Search ............ 423/220, 423/226, 282, 283
See application file for complete search history.

(56) References Cited

OTHER PUBLICATIONS

Simone Cavenati, et al., Removal of Carbon Dioxide from Natural Gas by Vacuum Pressure Swing Adsorption, Energy & Fuels, 2006, 20, pp. 2648-2659.

Simone Cavenati, et al., Adsorption Equilibrium of Methane, Carbon Dioxide, and Nitrogen on Zeolite 13X at Hight Pressures, J. Chem. Eng. Data, 2004, 49, 1095-1101.

Min-Bae Kim, et al., Kinetic Separation of Landfill Gas by a Two-Bed Pressure Swing Adsorption Process Packed with Carbon Molecular Sieve: Nonisothermal Operation, Ind. Eng. Chem. Res., 2006, 45, pp. 5050-5058.

A. Kapoor and R.T. Yang, Kinetic Separation of Methane-Carbon Dioxide Mixture by Adsorption on Molecular Sieve Carbon, Chemical Engineering Science, 1989, 44, pp. 1723-1733.

Yi Li, et al., Novel $Ag^+$-Zeolite/Polymer Mixed Matrix Membranes with High $CO_2/CH_4$ Selectivity, AIChE Journal, 2007, 53, pp. 610-616.

Peiyuan Li and F. Handan Tezel, Adsorption separation of $N_2$, $O_2$, $CO_2$ and $CH_4$ gases by β-zeolite, Microporous and Mesoporous Materials, 2007, 98, pp. 94-101.

Shiguang Li, et al., SAPO-34 membranes for $CO_2/CH_4$ separation, Journal of Membrane Science, 2004, 241, pp. 121-135.

Xuan Peng, et al., Adsorption Separation of $CH_4/CO_2$ on Mesocarbon Microbeads: Experiment and Modeling, AIChE Journal, 2006, 52, pp. 994-1003.

(Continued)

*Primary Examiner*—Timothy C Vanoy
*Assistant Examiner*—Daniel Berns

(57) ABSTRACT

A method of separating a mixture of carbon dioxide and a hydrocarbon gas using a metal-organic framework (MOF) material having a three-dimensional carborane ligand structure.

10 Claims, 3 Drawing Sheets

OTHER PUBLICATIONS

Jean-Marc Leyssale, et al., Sorption Thermodynamics of $CO_2$, $CH_4$, and Their Mixtures in the ITQ-1 Zeolite as Revealed by Molecular Simulations, J. Phys. Chem. B, 2006, 110, pp. 22742-22753.

Ravichandar Babarao, et al., Storage and Separation of $CO_2$ and $CH_4$ in Silicalite, $C_{168}$ Schwarzite, and IRMOF-1: A Comparative Study from Monte Carlo Simulation, Langmuir, 2007, 23, pp. 659-666.

V. Goetz, et al., Carbon dioxide-methane mixture adsorption on activated carbon, Adsorption, 2006, 12, pp. 55-63.

Randall Q. Snurr, et al., Prospects for Nanoporous Metal-Organic Materials in Advanced Separations Processes, AIChE Journal, 2004, 50, pp. 1090-1095.

Jesse L.C. Roswell and Omar M. Yaghi, Strategies for Hydrogen Storage in Metal-Organic Frameworks, Angew, Chem. Int. Ed., 2005, 44, pp. 4670-4679.

U. Mueller, et al., Metal-organic frameworks—prospective industrial applications, Journal of Materials Chemistry, 2006, 16, pp. 626-636.

Suzy Surblé, et al., Synthesis of MIL-102, a Chromium Carboxylate Metal-Organic Framework, with Gas Sorption Analysis, J. Am. Chem. Soc., 2006, 128, pp. 14889-14896.

Qingyuan Yang and Chongli Zhong, Molecular Simulation of Carbon Dioxide/Methane/Hydrogen Mixture Adsorption in Metal-Organic Frameworks, J. Phys. Chem. B, 2006, 110, pp. 17776-17783.

Qingyuan Yang and Chongli Zhong, Electrostatic-Field-Induced Enhancement of Gas Mixture Separation in Metal-Organic Frameworks: A Computational Study, ChemPhysChem, 2006, 7, pp. 1417-1421.

A.L. Myers and J.M. Prausnitz, Thermodynamics of Mixed-Gas Adsorption, AIChE Journal, 1965, pp. 121-127.

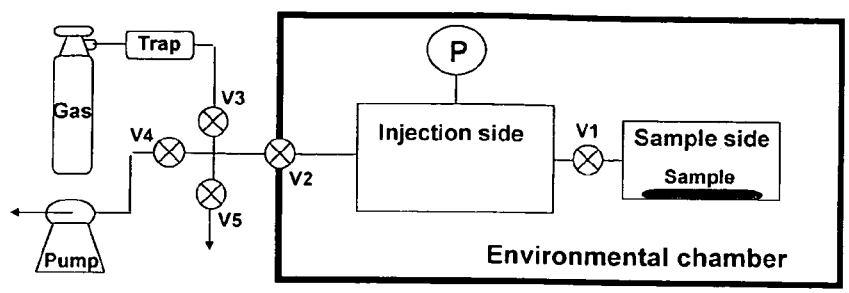
Figure 1
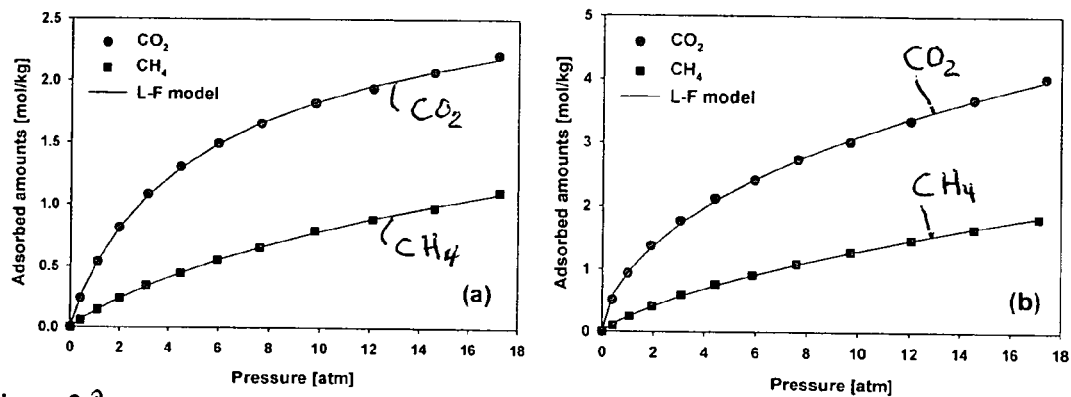
Figure 2a
Figure 2b

GAS ADSORPTION AND GAS MIXTURE SEPARATIONS USING CARBORANE-BASED MOF MATERIAL

RELATED APPLICATION

This application claims benefits and priority of provisional application Ser. No. 61/010,014 filed Jan. 4, 2008.

CONTRACTUAL ORIGIN OF THE INVENTION

This invention was made with government support under contract DE-FG02-01ER15244 awarded by the U.S. Department of Energy. The government has certain rights in the invention.

FIELD OF THE INVENTION

The present invention relates to methods for adsorption of gases such as carbon dioxide in the separation of carbon dioxide from gas mixtures.

BACKGROUND OF THE INVENTION

Carbon dioxide is often found as an impurity in natural gas and landfill gas, where methane is the major component. The presence of $CO_2$ reduces the energy content of natural gas and can lead to pipeline corrosion (references 1-7). If natural gas meets established purity specifications, it is designated "pipeline quality methane," which increases its commercial value. To meet pipeline requirements, natural gas must comply with strict $CO_2$ concentration limits, as low as 2% (references 1,2,5).

For the separation of $CO_2$ from natural gas, several technologies, such as absorption, cryogenic distillation, membrane separation, and adsorption, have been used. Among these technologies, adsorption-based methods such as pressure swing adsorption (PSA) are promising because of their simple and easy control, low operating and capital investment costs, and superior energy efficiency (references 1, 8, 9). In particular, adsorption is advantageous for the case of medium-and small-size processes (references 1, 9). After the suggestion by Sircar in the late 1980 (reference 10), many studies have been performed on PSA processes for the separation and purification of $CO_2$ from gaseous streams containing $CH_4$ (references 1, 3, 4, 11).

A key step in the design of PSA processes for the separation and purification of $CO_2$ is the selection of a highly selective adsorbent with a high $CO_2$ capacity (references 1, 8, 9, 11). Most studies of $CO_2/CH_4$ separation have focused on zeolites (references 1, 2,6,12,13) and carbon based adsorbents (references 3, 4, 8, 13, 14).

Recently, metal-organic frameworks (MOFs) have been recognized as a new family of porous materials that have potential applications in separations, sensing, gas storage, and catalysis (references 15-17). MOFs consist of metal or metal-oxide corners connected by organic linkers. They are synthesized in a self-assembly process from these well-defined building blocks and have high porosity and well-defined pore sizes. The synthetic strategy opens up the possibility to systematically vary pore size and chemical functionality in the search for an optimal adsorbent. For separations, an additional advantage is that MOFs can be regenerated under milder conditions than most zeolites, which require considerable heating and the associated high costs (reference 18).

To date, most studies of adsorption in MOFs have focused on single-component gases, and little is known about mixture behavior even though understanding multicomponent adsorption equilibrium is essential for designing adsorption-based separation processes. For $CO_2/CH_4$ mixtures in MOFs, all of the published work to date has come from molecular simulation. Yang and Zhong used grand canonical Monte Carlo (GCMC) to simulate mixtures of $CO_2$ and $CH_4$ in Cu—BTC and MOF-5 (references 19-20). At 1 bar and 298 K, they predicted that Cu—BTC has a selectivity of about 6 for $CO_2$ over $CH_4$, and MOF-5 has a selectivity of about 2, independent of gas-phase composition. Babarao used GCMC simulations to compare $CO_2/CH_4$ mixtures in MOF-5, the zeolite silicalite, and $C_{168}$ schwarzite (reference 13). They found that MOF-5 has a larger storage capacity, but the selectively is similar in all three materials. Both groups report that the simulated mixture behavior matches well with the behavior calculated from single-component isotherms using the ideal adsorbed solution theory (IAST) (references 13,19,21).

SUMMARY OF THE INVENTION

The present invention provides in one embodiment a method for selectively adsorbing carbon dioxide in the separation of carbon dioxide from a gas mixture using a polymeric crystalline material having a metal-organic framework (MOF) that includes a three-dimensional carborane structure. The method is useful to separate carbon dioxide from a gas mixture of carbon dioxide and a hydrocarbon gas such as, for example, methane, propane, and/or propylene, by contacting the gas mixture and the MOF material that selectively adsorbs carbon dioxide from the mixture. The invention is advantageous for the selective removal of carbon dioxide from natural gas, landfill gas, and other gas mixtures of $CO_2$ and $CH_4$.

In an illustrative embodiment of the invention, a MOF material useful in practice of the method is represented by the formula $Zn_3(OH)(p\text{-}CDC)_{2.5}$ where p-CDC represents a deprotonated form of 1,12-dihydroxycarbonyl-1,12-dicarba-closo-dodecaborane (p-CDCH$_2$), providing a CB ligand. This MOF material selectively adsorbs carbon dioxide from a room temperature mixture of carbon dioxide and methane and is especially effective to this end at relatively low bulk gas pressures and high mole fractions of methane in the mixture.

Another illustrative MOF material useful in practice of the method is represented by the formula $Zn_3(OH)(p\text{-}CDC)_{2.5}(L)_m$ where L is diethylformamide (DEF) or dimethylformamide (DMF) or other solvent molecule and m is an integer from 1 to 4. This MOF material is a precursor that can be heated in a manner to form the solvent-free material described above in the preceding paragraph (i.e. m is equal to 0) and also itself selectively adsorbs carbon dioxide from a room temperature mixture of carbon dioxide and methane in a manner relatively independent of bulk pressures and mole fractions of methane in the mixture, albeit at a reduced capacity compared to the above solvent-free material (i.e. m is equal to 0).

Other advantages and features of the present invention will become apparent from the following detailed description taken with the following drawings.

BRIEF DESCRIPTION OF THE DRAWINGS

FIG. 1 is a schematic diagram of high-pressure volumetric-type adsorption apparatus employed in testing carborane-based MOF materials of the invention.

FIGS. 2a and 2b are plots of adsorbed amounts of pure $CO_2$ and $CH_4$ as a function of bulk gas pressure on material 3, FIG. 2a, and on material 4, FIG. 2b pursuant to the invention.

(FIG. 3a) and in material 4 (FIG. 3b), respectively, as a function of bulk gas pressure at 25° C.

DETAILED DESCRIPTION OF THE INVENTION

Figure 3A:
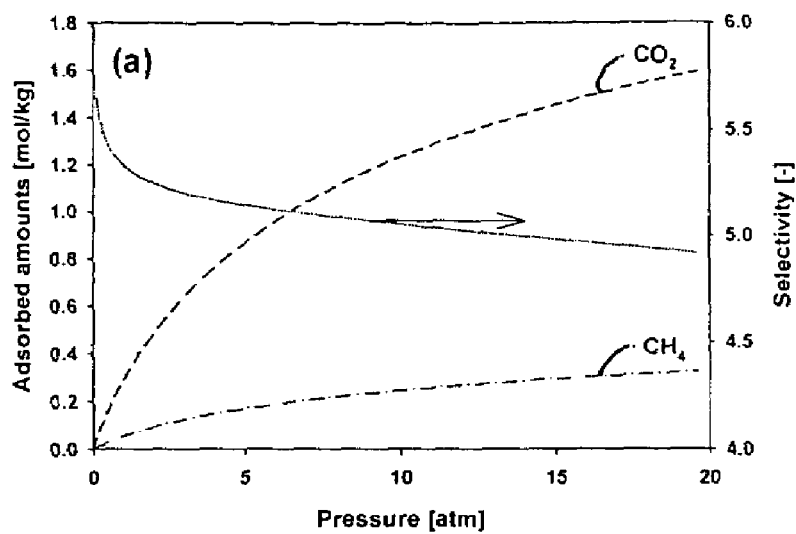
FIGS. 3a and 3b show the adsorption isotherms and selectivity of equimolar mixture of $CO_2$ and $CH_4$ in material 3

An embodiment of the present invention provides a method for selectively adsorbing carbon dioxide in the separation of carbon dioxide and a hydrocarbon gas, such as for example methane, using a polymeric crystalline material having a metal-organic framework (MOF) that includes a three-dimensional carborane structure. The method can be practiced by contacting the gas mixture of carbon dioxide and hydrocarbon gas and the MOF material that selectively adsorbs carbon dioxide from the mixture. For purposes of illustration and not limitation, the method can be used to separate carbon dioxide from a gas mixture that includes carbon dioxide and methane, propane and/or propylene. For purposes of further illustration and not limitation, the method of the invention can be practiced to carry out the well known pressure swing adsorption (PSA) process wherein carbon dioxide of the mixture is selectively adsorbed on the polymeric crystalline MOF material at relatively high pressure followed by a reduction in pressure for carbon dioxide desorption to regenerate the material. Substantially reversible carbon dioxide adsorption on and desorption from the MOF material can occur in practice of the PSA process and others. The invention is advantageous for the selective removal of carbon dioxide from natural gas, landfill gas, and other gas mixtures of $CO_2$ and $CH_4$.

In general, carboranes are icosahedral carbon-containing boron clusters. For example, dicarbon carboranes have the form represented by $C_2B_{n-2}H_n$ where n is greater than or equal to 6 and equal to or less than 12 and can be regarded as three-dimensional delocalized aromatic systems in which surface bonding and core bonding correspond to σ-bonding and π-bonding, respectively.

The method can be practiced pursuant to an illustrative embodiment of the invention using a polymeric crystalline material having a metal-organic framework that includes a three-dimensional carborane structure. In a particular embodiment, the polymeric crystalline MOF material is represented by the formula $[Zn_3(OH)(p\text{-}CDC)_{2.5}L_m]_n$ where p-CDC (or p-CDC$^{2-}$) represents a deprotonated form of 1,12-dihydroxycarbonyl-1,12-dicarba-closo-dodecaborane (p-CDCH$_2$), providing a CB ligand, and m is an integer from 0 to 4. When m is 0, the material comprises the preferred polymeric crystalline material $Zn_3(OH)(p\text{-}CDC)_{2.5}$, which is substantially free of solvents, such as having less than 1% by weight of solvents based on the weight of the MOF and preferably from 0 to about 0.5% by weight of solvents based on the weight of the MOF. The three-dimensional carborane structure comprises C and B atoms in an array having a three-dimensional icosahedral shape. The material is made by coordinating metal cations to a deprotonated form of 1,12-dihydroxycarbonyl-1,12-dicarba-closo-dodecaborane in a manner to form the metal-organic framework that includes the three dimensional carborane structure. Such MOF materials, their crystalline structure, and their synthesis are described in copending application Ser. No. 12/180,074 filed Jul. 25, 2008 of common assignee herewith, the teachings of which are incorporated herein by reference to this end. Although Zn(II) coordination to the deprotonated form of 1,12-dihydroxycarbonyl-1,12-dicarba-closo-dodecaborane is described herein, the MOF material can embody any suitable metal cation, M, other than Zn(II) in lieu or in addition to Zn(II) ions.

EXAMPLES

For purposes of illustration and not limitation, a particular illustrative material described above can be made by Zn(II) (i.e. Zn$^{+2}$ cation) coordination to the deprotonated form of 1,12-dihydroxycarbonyl-1,12-dicarba-closo-dodecaborane (p-CDCH$_2$) followed by heating at superambient temperature in a manner to remove some or all of the solvent molecules, such as DEF or DMF.

Starting materials were purchased from Sigma-Aldrich (ACS grade) and used without further purification unless otherwise noted. Diethyl ether (Et$_2$O) was purified by published methods (e.g. Armarego et al. "Purification of Laboratory Chemicals", Butterworh-Heinemann: Oxford, 1996, and Pangborn et al., Organometallics, 1996, 15, p. 1518, the teachings of which are incorporated herein by reference) and deoxygenated with nitrogen prior to use. Deuterated solvents were purchased and used as received from Cambridge Isotopes Laboratories.

Analytical testing was conducted as follows. Analytical thin layer chromatography (TLC) was performed using glass plates pre-coated with silica gel (0.25 mm, 60 A pore size) with a fluorescent indicator (254 nn). Visualization was accomplished with UV light and/or palladium chloride (PdCl$_2$) in 6 M hydrochloric acid as a stain.

Powder X-ray diffraction (PXRD) patterns were recorded with a Rigaku XDS 2000 diffractometer using nickel-filtered Cu Kα radiation (λ=1.5418 Angstroms).

Thermogravimetric analyses (TGA) were performed on a Mettler-Toledo TGA/SDTA851e. Adsorption isotherms were measured with an Autosorb 1-MP from Quantachrome Instruments. Infrared spectra were obtained on a BIO RAD FTS-60 spectrophotometer. $^1$H NMR and $^{13}$C NMR were done on a Varian Inova 500 spectrometer at 500 MHz and 125 MHz respectively. $^{11}$B NMR was done on a Varian Inova 400 spectrometer at 128.6 MHz.

NMR splitting patterns were designated as singlet (s), doublet (d), triplet (t), quartet (q). Splitting patterns that could not be interpreted or easily visualized are designated as multiplet (m) or broad (bi). Coupling constants are reported in Hertz (Hz).

Preparation of 1,12-Dihydroxycarbonyl-1,12-dicarba-closo-dodecaborane can be as follows:

To 2 g (13.9 mmoles) of 1,12-dicarba-closododecaborane (p-carborane), dissolved in 150 mL of dry diethyl ether and stirred at 0° C., 1.6M (35 mL, 56 mmoles) n-BuLi was added via syringe. The reaction mixture warmed to room temperature and then refluxed for 1. 5 hours. The reaction then was cooled to approximately 78° C. utilizing a dry-ice/acetone bath. Carbon dioxide gas was bubbled into the reaction mixture for an hour while stirring. Diethyl ether was concentrated and the white solid was stirred in 100 mL of 3M hydrochloric acid. Precipitate was filtered and washed in the following order: chilled water, hexanes, chloroform. The product was obtained as white solid (2.81 g, 87% yield) and dried on vacuum overnight.

Single crystals of the product were grown from ethanol: water (1:1) by slow evaporation over-several days.

Preparation of material 2 represented by [Zn₃(OH) (p-CDC)$_{2.5}$(L)$_4$]$_n$ where L is diethylformamide (DEF) or dimethylformamide (DMF):

A. For crystal growth study: exact amounts of Zn(NO₃)6H₂O (33 mg, 0.11 mmole) and 1,12 dicarboxylic-1,12-dicarba-closo-dodecaborane (8.3 mg, 0.035 mmole) were dissolved in a vail using 1 ml of diethylformamide (DEF). The solution was heated at 80° C. for 24 hours.

B. Large scale synthesis: exact amounts of Zn(NO₃) 6H₂O (1.20 g, 4.03 mmole) and 1,12-dicarboxylic-1,12-dicarba-closo-dodecaborane (0.30 g, 1.28 mmole) were dissolved in a large vail using (1:1) dimethylformamide (DMF):ethanol (18 ml:18 ml). The solution was heated at 80° C. for 24 hours. The crystals were collected by filtration, washed with DMF followed by ethanol and then dried in air. The reaction yielded 480 mg, 32% based on zinc.

Preparation of Material 4 Represented by [Zn₃(OH) (p-CDC)$_{2.5}$]:

Crystals of material 2 were evacuated and heated at 300° C. for 24 hours in a vacuum oven.

Preparation of Material 3 Represented by [Zn₃(OH) (p-CDC)$_{2.5}$(DMF)$_4$]$_n$:

Crystals of material 2 were evacuated and heated at 100° C. for 24 hours in a vacuum oven.

X-ray analysis of a single crystal of [Zn₃(OH)(p-CDC)$_{2.5}$(DEF)$_4$]$_n$ revealed a structure in which two of the three zinc ions are coordinated to two DEF molecules each in an octahedral geometry. In addition, one of the dicarboxylate ligands in the structure is ligated to zinc through only one oxygen atom. The zinc ions are further connected by a triply bridging hydroxide ion. The three dimensional topology and connectivity of this material are described in copending application Ser. No. 12/180,074 filed Jul. 25, 2008 of common assignee herewith, the teachings of which are incorporated herein by reference to this end.

Thermogravimetric analysis (TGA) of [Zn₃(OH) (p-CDC)$_{2.5}$(DEF)$_4$]$_n$ revealed mass losses between 125-175° C. and 175-250° C., assigned to free and coordinated DEF respectively, but no further mass loss up to 500° C. Elemental analysis measurements of the crystalline material heated under vacuum at 300° C. confirmed the removal of the coordinated DEF.

Powder x-ray diffraction (PXRD) measurements established that although the crystallinity is retained, the structure is irreversibly altered. Although a single-crystal structure of [Zn₃(OH)(p-CDC)$_{2.5}$] (i.e. the DEF free version of material 3) has not been obtained, infrared data strongly suggest that the partially coordinated carboxylate of material 3 becomes fully coordinated in material 4. Nonetheless, the number of coordination sites occupied by DEF in material 3 is greater than the number of coordination sites needed for complete coordination of p-CDC$^{2-}$. This mismatch may result in coordinatively unsaturated or at least highly reactive metal sites, although applicants do wish or intend to be bound by any theory in this regard.

Carbon Dioxide Adsorption Measurements:

Samples of known weight were evacuated at the appropriate temperature (300 degrees C. material 4 or 100 degrees C. for material 3) under 10$^{-5}$ torr dynamic vacuum for 24 hours on an Autosorb 1-MP from Quantachrome Instruments prior to gas adsorption measurements. The evacuated sample was weighed again to obtain the sample weight.

Measurements of the adsorption isotherms of CO₂ and CH₄ of material 3 and material 4 were made. All of the isotherms were measured at 25 degrees C. and up to 18 atmospheres pressure using a volumetric-type apparatus shown schematically in FIG. 1. The apparatus was composed of an injection side, a sample side, a vacuum pump, valves V1 through V5, and a pressure transducer P. Both sides and all the lines were located in an environmental chamber to maintain a constant temperature. The volumes of the injection and sample sides were measured by He gas. Equilibrium pressures were measured with an MKS Baratron transducer 627B (accuracy±0.12%). The pressure change was monitored in real time using LabVIEW software (version 7.1). After an adsorbate in the injection side was stabilized at constant T and P, the adsorbate was supplied from the injection side to the sample side so as to contact the sample. Then, the adsorption isotherms were measured by the stepwise pressure change.

Before each measurement, a 60-70 mg sample was evacuated overnight at 100 degrees C. (material 3) or 300 degrees C. (material 4) in the sample chamber, and the void volume of the chamber plus the sample system was determined by using He gas. The pump shown is employed to create a vacuum to this end.

Since the closed system consisted of an adsorbent and an adsorbate at a constant volume, the sum of the moles of adsorbate in the adsorbent and the gas phase was constant during each step. Hence, the adsorbed amounts per unit adsorbent mass were calculated by the mass balance for a pure gas in the injection and sample sides (equation S1) incorporated with the generalized viral-coefficient correlation (equation S2) [see Bae and Lee, Carbon (2005) 43, 95]:

$$\left.\frac{PV}{zRT}\right|_{\substack{\text{Moles of gas} \\ \text{in the injection side} \\ \text{before valve open}}} + \left.\frac{PV}{zRT}\right|_{\substack{\text{Moles of gas} \\ \text{in the sample side} \\ \text{before valve open}}} = \quad (S1)$$

$$\left.\frac{PV}{zRT}\right|_{\substack{\text{Moles of gas} \\ \text{in the total system} \\ \text{after valve open}}} + M\left|_{\text{Mass of adsorbent}} \cdot q\right.$$

$$z = 1 + \left(0.083 - \frac{0.422}{T_r^{1.6}}\right) \cdot \frac{P_r}{T_r} + \omega \cdot \left(0.139 - \frac{0.172}{T_r^{4.2}}\right) \cdot \frac{P_r}{T_r} \quad (S2)$$

The volumetric apparatus was tested to be leak-free using He gas. In addition, the accuracy of the system was proved by measuring CO₂ adsorption on NaY zeolite (CBV 100, Zeolyst), where the expected adsorption is known from prior reports in the literature.

Carbon dioxide (99.9%) and methane (99%) were purchased from Airgas Inc., Radnor, Pa. Gases were passed through a zeolite molecular sieve in order to remove residual moisture. Pressures were measured with a MKS Baratron transducer 627B with the range covering 0-20,000 Torr (accuracy of plus or minus 0.12%). The adsorbate was added incrementally and equilibrium was assumed when no further change of pressure was observed (within 0.01 kPa).

FIG. 2a shows the adsorption isotherms of pure CO₂ and CH₄ on material 3 at 25 degrees C. FIG. 2b shows the adsorption isotherms of pure CO₂ and CH₄ on material 4 at 25 degrees C.

For both gases, material 4 shows larger adsorption capacities than material 3 since material 4 has a larger available pore volume due to removal of the coordinated solvent (DEF) from the metal-organic framework. Both materials 3 and 4 have considerable selectivity of $CO_2$ over $CH_4$.

Figure 3B:
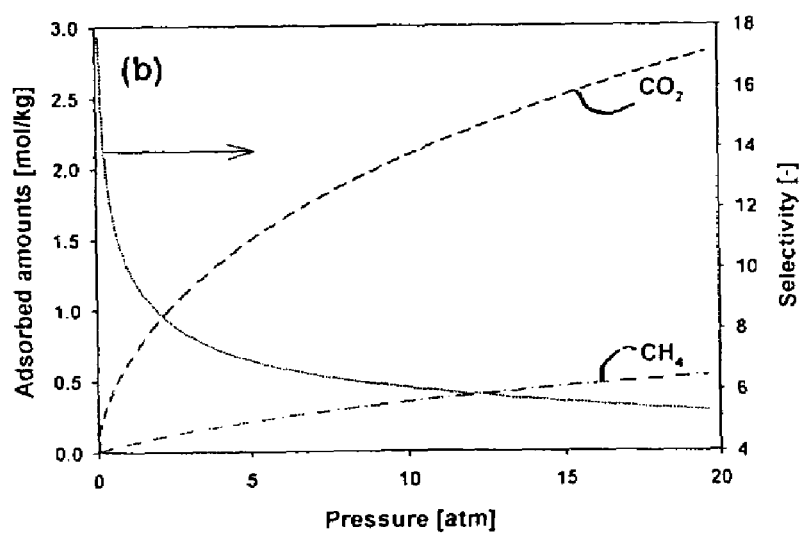
Figure 4A:
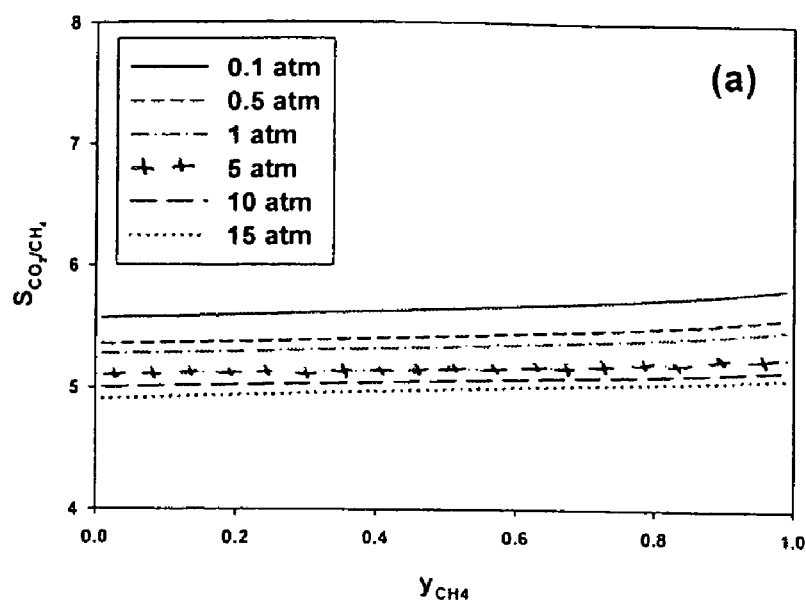
FIGS. 4a and 4b show the adsorption selectivity of $CO_2$ over $CH_4$ in material 3 (FIG. 4a) and in material 4 (FIG. 4b) respectively, as a function of bulk mole fraction of $CH_4$ at several pressures (at 25° C.).
Figure 4B:
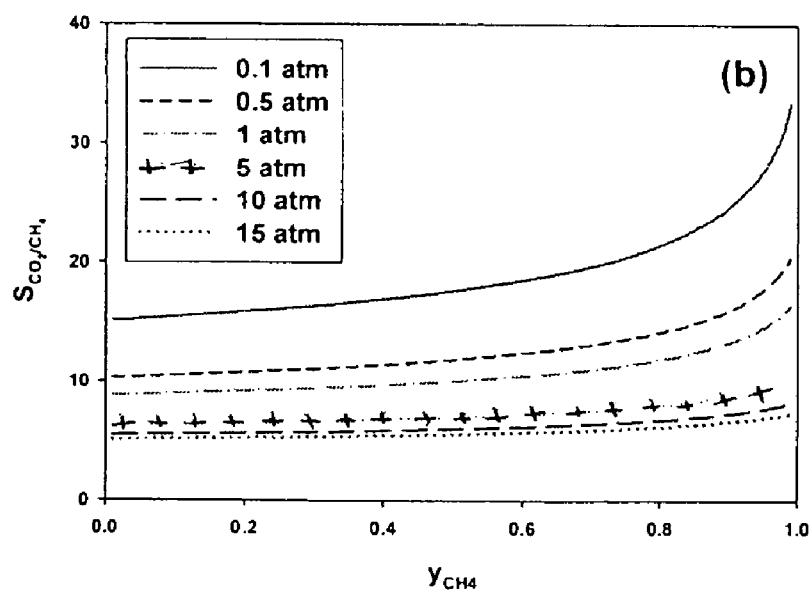

Fitting Adsorption Isotherms:

The Langmuir-Freundlich (LF) isotherm (Equation 1) was used to fit the adsorption isotherm of pure gas:

$$C_u = C_{us}[(b\, p^{1/n})/(1+b\, p^{1/n})] \quad \text{(equation 1)}$$

where $C_u$ is the adsorbed amounts (mol/kg), $C_{us}$ is the saturation capacity (mol/kg), p is the gas pressure (atm), and b is the affinity constant (1/atm), and n is used to characterize the deviation from the simple Langmuir equation. The fitting parameters are shown in Table 1 which will be used to predict the adsorption of a mixture. The experimental data and the fit isotherms are shown in FIGS. 3a and 3b. The adsorption isotherms for both gases are well fitted by the LF isotherm and the fitted isotherms are also shown in FIGS. 4a and 4b.

TABLE 1

Parameters for the LF equation fitted to the adsorption isotherms of pure $CO_2$ and $CH_4$

|  | Adsorbate | $C_{us}$ [mol/kg] | B [1/atm] | N [-] |
| --- | --- | --- | --- | --- |
| Material 3 | $CO_2$ | 11250 | 0.1921 | 1.1466 |
|  | $CH_4$ | 2.7997 | 0.0500 | 1.1163 |
| Material 4 | $CO_2$ | 141285 | 0.0711 | 1..6828 |
|  | $CH_4$ | 7.9812 | 0.0314 | 1.2614 |

With these isotherm parameters, calculations on the adsorption isotherms of mixtures were performed using ideal adsorbed solution theory (IAST) described by Myers et al. in AIChE Journal, 1965, 11, ppp. 121-127, the teachings of which are incorporated herein by reference. It has been commonly recognized that IAST can give excellent predictions of gas mixture adsorption in many zeolites and recently in MOFs (references 2, 19) using experimentally measured single-component isotherms as inputs. In separation processes, a good indication of the ability for separation is the selectivity ($S_{S/B}$) of a porous material for different components in mixtures. The adsorption selectivity in a binary mixture of component A and B is defined as follows:

$$S_{S/B} = (x_A/x_B)(y_B/y_A) \quad \text{(equation 2)}$$

where $x_i$ and $y_i$ are the mole fractions of component i (i=A, B) in the adsorbed and bulk phases, respectively.

FIGS. 3a and 3b show the adsorption isotherms for an equimolar mixture of $CO_2/CH_4$ in material 3 and material 4, respectively, as a function of total bulk pressure. For both MOF materials 3 and 4, $CO_2$ is much more preferentially adsorbed than $CH_4$ because of the stronger interaction between $CO_2$ and surfaces of the MOF. The gaps between both isotherms are much larger than those shown in the single component isotherms in FIGS. 2a and 2b. This is due to the competitive adsorptions of $CO_2$ and $CH_4$ in the mixture conditions. FIGS. 3a and 3b also represent the predicted adsorption selectivity of $CO_2$ over $CH_4$. For both metal-organic frameworks, the selectivity decreases with the increase of pressure.

As shown in FIGS. 3a, 3b, material 4 gives much larger selectivity (selectivity of 5-18) although material 3 still shows considerable selectivity (selectivity of 5 to about 5.6). Material 4 is among the best materials for this purpose when compared with other commonly used adsorption materials. Material 3 is a good candidate material for $CO_2/CH_4$ separations and thus is a promising material for the separation and purification of $CO_2$ from $CH_4$ mixtures.

FIGS. 4a and 4b represent the adsorption selectivity toward $CO_2$ as functions of bulk pressure and bulk mole fraction of $CH_4$ for material 3 and material 4, respectively. In case of material 3, selectivity is almost constant even though pressure or mole fraction changes. Conversely, in case of material 4, selectivity varies with the change of pressure or mole fraction. As the pressure decreases, the selectivity rapidly increases in material 4. In addition, as the pressure goes to dilution region (0.1 atm), extremely large selectivity (17 to about 35) can be obtained, especially at high mole fractions of $CH_4$. This indicates that $CO_2$ adsorption is extremely dominant at low pressure range. Hence, operations at low pressures are advantageous if applied to PSA processes, for the purification of natural gas and the separation of landfill gas. Importantly, at low pressures, the selectivity increases steeply as $y_{CH4}$ approaches to 1.0. This indicates that material 4 will show the highest selectively of $CO_2$ over $CH_4$ when $CO_2$ is present in very low concentrations, which is the most technologically relevant composition.

Although the invention has been described above in connection with certain illustrative embodiments, those skilled in the art will appreciate that the invention is not limited to these embodiments and that changes, modifications and the like can be made thereto within the scope of the invention as set forth in the appended claims.

REFERENCES:

(1) Cavenati. S.; Grande, C. A.; Rodligues. A. E. Energy Fuels 2006, 20, 2648. (2) Cavenati. S.; Grande, C. A.: Rodrigues, A. E. J. Chem. Eng. Data 2004, 49. 1095.
(3) Kim, M. B.; Bae. Y. S.; Choi, D. K.; Lee, C. H. Ind. Eng. Chem. Res. 2006, 45. 5050.
(4) Kapoor, A.: Yang, R. T. Chem. Eng. Sci. 1989, 44, 1723.
(5) Li, Y.; Chung, T. S.: Kulprathipanja, S. AIChE J. 2007, 53, 610.
(6) Li, P. Y.: Tezel, F. H. Microporous Mesoporous Mater. 2007, 98. 94,
(7) Li, S. G.; Falconer, J. L.; Noble, R. D. J. Membr. Sci. 2004, 241, 121.
(8) Peng, X.; Wang, W. C.; Xue, R. S.; Shen, Z. M. AIChEJ. 2006, 52.994.
(9) Yang, R. T. Gas Separation by Adsorption Processes; Butterworths: Boston, Mass., 1987.
(10) Sircar, S. Sep. Sci. Technol. 1988, 23, 519.
(11) Yang, R. T. Adsorbents: Fundamentals and Applications: John Wiley & Sons, Inc.: Hohoken, N.J., 2003.
(12) Leyssale et al., J. Phys. Chem. B, 2006, 110, 22742.
(13) Babarao, R.; Hu, Z.; Jiang, J.; Chempath, S.; Sandler, S. I. Langmuir 2007, 2.3, 659.
(14) Goetz, V.; Pupier, 0.; Guillot, A. Adsorption-Journal of the International Adsorption Society 2006, 12, 55-63.
(15) Snurr et al., AIChE. J., 2004, 50, 1090.
(16) Rowsell et al., Angew Chem. Int Ed, 2005, 44, 4670.
(17) Mueller et al., J. Mater. Chem. 2006, 16, 626.
(18) Surble et al. J. Am. Chem. Soc. 2006, 128, 14889.
(19) Yang et al., J. Phys. Chem. B, 2006, 110, 17776.
(20) Yang et al., ChemPhysChem, 2006, 7, 1417.
(21) Myers, A. L.; Prausnitz, J. M. AIChE J. 1965, 11, 121.

The invention claimed is:

1. A method of separating carbon dioxide from a gas mixture, comprising contacting the mixture and a material having a metal-organic framework that includes a three dimensional carborane structure wherein the material selectively adsorbs carbon dioxide.

2. The method of claim 1 wherein the material is represented by the formula $Zn_3(OH)(p\text{-}CDC)_{2.5}$ where p-CDC represents a deprotonated form of 1,12-dihydroxycarbonyl-1,12-dicarba-closo-dodecaborane.

3. The method of claim 1 wherein the material is represented by the formula $Zn_3(OH)(p\text{-}CDC)_{2.5}(L)_m$ where L is a solvent molecule and m is an integer from 1 to 4.

4. The method of claim 3 wherein L is diethylformamide or dimethylformamide.

5. The method of claim 1 wherein said gas mixture includes a hydrocarbon gas.

6. The method of claim 5 wherein the hydrocarbon gas comprises methane, propane, and/or propylene.

7. The method of claim 1 that separates carbon dioxide from natural gas.

8. The method of claim 1 that separates carbon dioxide from landfill gas.

9. The method of claim 1 including the further step of substantially reversible carbon dioxide desorption from the material.

10. The method of claim 1 that uses the pressure swing adsorption process for separation of the mixture.

\* \* \* \* \*